(12) United States Patent
Megawa

(10) Patent No.: US 8,970,932 B2
(45) Date of Patent: *Mar. 3, 2015

(54) DECOLORIZING DEVICE, SHEET DECOLORIZING METHOD, AND RECORDING MEDIUM FOR RECORDING DECOLORIZING PROCESS PROGRAM

(71) Applicants: Kabushiki Kaisha Toshiba, Minato-Ku, Tokyo (JP); Toshiba Tec Kabushiki Kaisha, Shinagawa-ku, Tokyo (JP)

(72) Inventor: Shunichi Megawa, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/246,420

(22) Filed: Apr. 7, 2014

(65) Prior Publication Data

US 2014/0218777 A1    Aug. 7, 2014

Related U.S. Application Data

(63) Continuation of application No. 13/432,584, filed on Mar. 28, 2012, now Pat. No. 8,730,544.

(60) Provisional application No. 61/472,670, filed on Apr. 7, 2011.

(51) Int. Cl.
*H04N 1/04* (2006.01)
*H04N 1/56* (2006.01)
(Continued)

(52) U.S. Cl.
CPC ............... *H04N 1/56* (2013.01); *B41M 7/0009* (2013.01); *G03G 21/00* (2013.01); *H04N 1/0032* (2013.01); *H04N 1/00588* (2013.01);
(Continued)

(58) Field of Classification Search
USPC .......................... 358/505, 513, 515, 474, 498
See application file for complete search history.

(56) References Cited

U.S. PATENT DOCUMENTS

| 5,289,296 A | 2/1994 | Yamada |
| 8,270,046 B2 * | 9/2012 | Tamura ......................... 358/500 |

FOREIGN PATENT DOCUMENTS

JP    2010-094960    4/2010

OTHER PUBLICATIONS

U.S. Office Action mailed Sep. 13, 2013 corresponding to U.S. Appl. No. 13/432,584, filed Mar. 28, 2014.

*Primary Examiner* — Houshang Safaipour
(74) *Attorney, Agent, or Firm* — Amin, Turocy & Watson, LLP

(57) ABSTRACT

A decolorizing device includes a first reading section, a decolorizing section, a second reading section and a controller. The first reading section reads a first side of the sheet. The decolorizing section performs a decolorizing process on the sheet and the second reading section reads the first side of the sheet. The controller is configured to determine if the decolorizing process is necessary or not on the first side based on first image data of the first side read by the first reading section, to read the first side of the sheet having been subjected to the decolorizing process at the decolorizing section by the second reading section if it is determined that the decolorizing process is necessary, and to avoid reading of the first side of the sheet by the second reading section if it is determined that the decolorizing process is unnecessary.

20 Claims, 10 Drawing Sheets

(51) Int. Cl.
*B41M 7/00* (2006.01)
*G03G 21/00* (2006.01)
*H04N 1/00* (2006.01)
*H04N 1/203* (2006.01)
*H04N 1/44* (2006.01)

(52) U.S. Cl.
CPC ...... *H04N 1/00594* (2013.01); *H04N 1/00596* (2013.01); *H04N 1/00633* (2013.01); *H04N 1/2032* (2013.01); *H04N 1/448* (2013.01)

USPC ............ 358/505; 358/513; 358/515; 358/474

DECOLORIZING DEVICE, SHEET DECOLORIZING METHOD, AND RECORDING MEDIUM FOR RECORDING DECOLORIZING PROCESS PROGRAM

CROSS-REFERENCE TO RELATED APPLICATIONS

This application is a Continuation of application Ser. No. 13/432,584 filed on Mar. 28, 2012, which is based upon and claims the benefit of priority from U.S. provisional application 61/472,670, filed on Apr. 7, 2011; the entire contents of which are incorporated herein by reference.

FIELD

Embodiments described herein relate generally to a technique of a decolorizing process for an image formed by a decolorable colorant.

BACKGROUND

There has been known a decolorizing device for decolorizing an image on a sheet by subjecting the sheet including the image formed thereon with a decolorable colorant to a decolorizing process such as heating so as to turn the decolorable colorant in a colored state into a decolorized state. Some of such decolorizing devices read an image on a sheet and save the image data before performing the decolorizing process. Moreover, in some of such decolorizing devices, a side having been subjected to the decolorizing process is read after the decolorizing process of the image, and a destination of sheet discharge is sorted into either a reusable sheet stacking section for stacking reusable sheets or a rejected sheet stacking section for stacking non-reusable sheets based on determination if there is an undecolorized portion or not.

In order to perform both of the image data saving before the decolorizing process and the determination regarding the existence of an undecolorized portion, image reading needs to be performed before and after the decolorizing process. In such a case, however, there is a problem of an increase in time to finish the series of decolorizing processes.

DETAILED DESCRIPTION

According to an embodiment, a decolorizing device typically includes a first reading section, a decolorizing section, a second reading section and a controller. The first reading section reads a first side of the sheet. The decolorizing section is configured to perform a decolorizing process on the sheet that has been read by the first reading section. The second reading section is configured to read the first side of the sheet that has been processed by the decolorizing section. The controller is configured to determine if the decolorizing process is necessary or not on the first side based on first image data of the first side read by the first reading section, to read the first side of the sheet having been subjected to the decolorizing process at the decolorizing section by the second reading section if it is determined that the decolorizing process is necessary, and to avoid reading of the first side of the sheet by the second reading section if it is determined that the decolorizing process is unnecessary.

Embodiments will be described below with reference to the drawings.

First Embodiment

Figure 1:
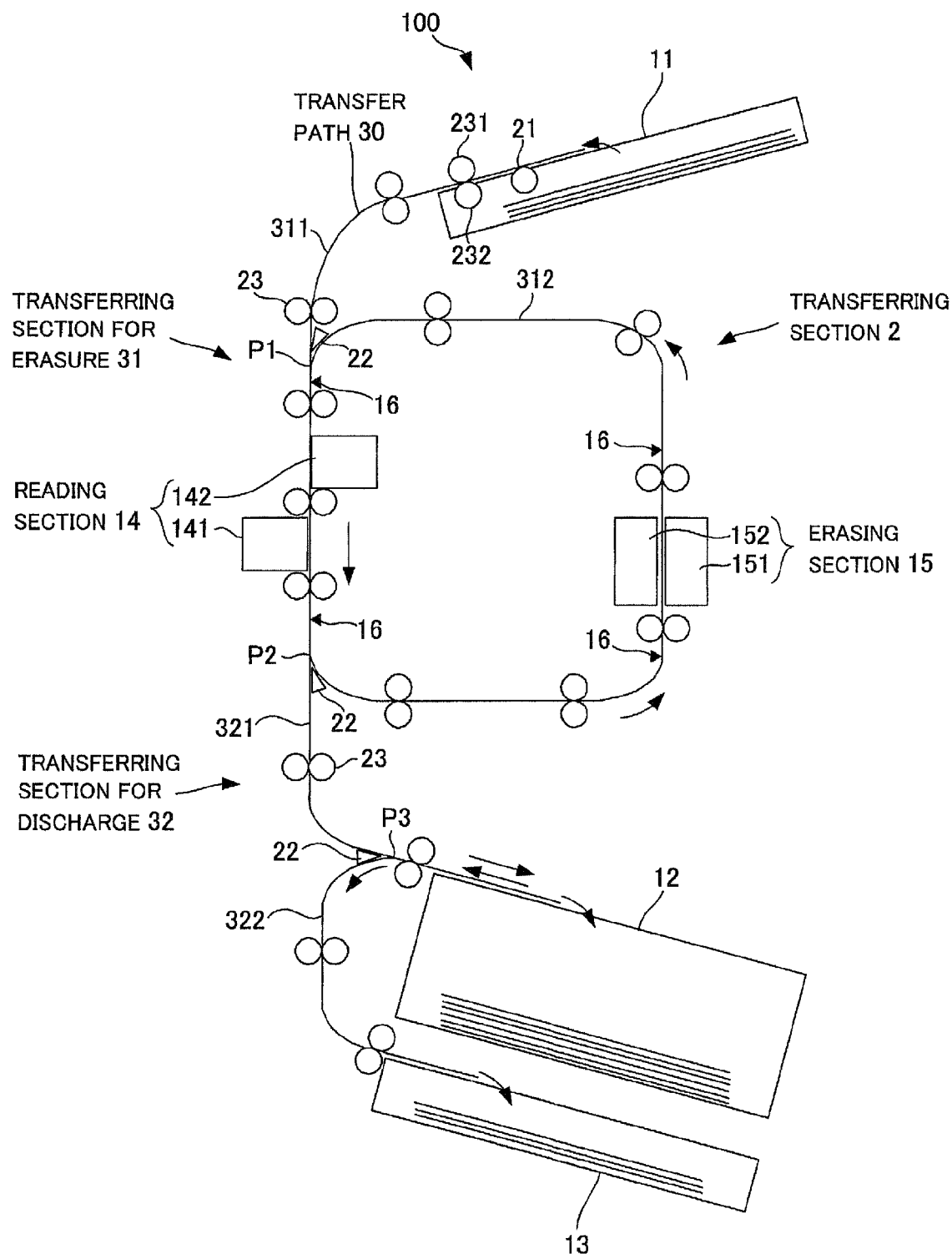
FIG. 1 is a diagram showing a sheet transfer path in a decolorizing device according to a first embodiment.

FIG. 1 is a diagram showing a sheet transfer path in a decolorizing device 100.

The decolorizing device 100 performs a decolorizing process on a sheet on which an image is formed with a decolorable colorant so as to turn the decolorable colorant in a colored state into a decolorized state, thereby decolorizing the image on the sheet. In the present embodiment, it is assumed that the image on the sheet to be decolorized by the decolorizing device 100 is formed by a powdered decolorable toner or a liquid decolorable ink capable of being decolorized when heated. Moreover, in the present embodiment, the sheet is heated as the decolorizing process and the image on the sheet is thereby decolorized. However, the decolorizing device may be alternatively configured to irradiate, as a decolorizing process, a sheet with light such as near-infrared light so as to decolorize an image on the sheet. In this case, the image on the sheet is formed by a decolorable toner or a decolorable ink capable of being decolorized by the irradiation of light such as near-infrared light. The decolorable toner or the decolorable ink capable of being decolorized by the light irradiation may be a toner or an ink which is decolorized by light in the vicinity of a wavelength of 820 nm, for example, but does not respond to light in the vicinity of a wavelength of 600 nm irradiated from a fluorescent lamp.

The decolorizing device 100 includes a sheet feeding cassette 11, a reusable sheet cassette 12 (reusable sheet stacking section), a rejected sheet cassette 13 (rejected sheet stacking section), a transferring section 2, a reading section 14 (a first reading section and a second reading section), a decolorizing section 15, and sensors 16.

The sheet feeding cassette 11 accommodates sheets on which images have been formed by decolorable colorants. A sheet size thereof may vary, for example, A4, A3, B5, or LTR.

A sheet made reusable as a result of the image docoloring is discharged to the reusable sheet cassette 12 from the transferring section 2.

A non-reusable sheet due to the presence of an image in a colored state is discharged to the rejected sheet cassette 13 from the transferring section 2.

Although the reusable sheet stacking section and the rejected sheet stacking section are in the form of cassettes in the present embodiment, they may not be cassettes as long as they can stack sheets thereon. For example, they may be trays or sections in a body of the decolorizing device provided so as to be accessible to the outside and capable of stacking sheets thereon.

The transferring section 2 transfers sheets. The transferring section 2 includes a transfer path 30 for guiding a sheet, a pickup roller 21 for picking up a sheet onto the transfer path 30 from the sheet feeding cassette 11, flappers 22 for sorting a sheet into any one route of the branching transfer path 30, and transferring rollers 23 for transferring a sheet on the transfer path 30.

The transfer path 30 includes transfer paths 311, 312, 321, and 322.

The transfer path 312 is in the form of a ring. The transfer path 311 connects between the sheet feeding cassette 11 and the transfer path 312. The transfer path 321 connects between the transfer path 312 and the reusable sheet cassette 12. The transfer path 322 is connected to a midway of the transfer path 321 and connects between the transfer path 321 and the rejected sheet cassette 13.

The transferring roller 23 is formed by a pair of a driving roller and a driven roller. The transferring roller 23 includes a sheet feeding roller 231 and a separation roller 232. The sheet feeding roller 231 and the separation roller 232 are provided as a pair. When the pickup roller 21 sends a plurality of sheets to the transfer path 311 from the sheet feeding cassette 11, the sheet feeding roller 231 and the separation roller 232 separate a sheet from the plurality of sheets and send it to the transfer path 311.

The transferring section 2 including the above-described elements can be functionally divided into a transferring section 31 for decolorizing, which is for decolorizing an image, and a transferring section 32 for discharge, which is connected to the transferring section 31 for decolorizing and is for discharging sheets to the outside of the transferring section 2 (the cassettes 12 and 13). The transferring section 31 for decolorizing includes the transfer paths 311 and 312, the flappers 22, and the transferring rollers 23. The transferring section 32 for discharge includes the transfer paths 321 and 322, the flapper 22, and the transferring rollers 23.

The ring-shaped transfer path 312 is provided with a junction P1 with the transfer path 311 for transferring sheets from the sheet feeding cassette 11 to the transfer path 312. The ring-shaped transfer path 312 is also provided with a branching point P2 from which the transfer path 321 for discharging sheets to the cassettes 12 and 13 is branched. In the transfer path 312, a sheet transferring direction is counterclockwise in FIG. 1.

The reading section 14 is placed between the junction P1 and the branching point P2 on the transfer path 312 in the sheet transferring direction. The reading section 14 includes two reading units 141 and 142 such as a CIS (contact image sensor), a CCD (charge coupled device image sensor), or a CMOS (complementary metal oxide semiconductor) provided along the transfer path 312. The reading section 14 reads an image on a first side of a sheet and an image on a second side, which is the reverse side of the first side, i.e., images on the both sides of the sheet at once. Image data obtained by the reading section 14 is stored in a memory 43 to be described later. According to the present embodiment, the image data before performing the decolorizing process is stored in the memory 43, thereby being able to reproduce the image recorded on the sheet even after performing the decolorizing process. Thus, the convenience thereof is improved.

The decolorizing section 15 is placed between the branching point P2 and the junction P1 on the transfer path 312 in the sheet transferring direction. In the ring-shaped transfer path 312, a distance between the reading section 14 and the decolorizing section 15 in the sheet transferring direction and a distance between the decolorizing section 15 and the reading section 14 in the sheet transferring direction are respectively longer than a length (297 mm) of a long side of an A4-size sheet (210 mm×297 mm). The decolorizing section 15 includes two decolorizing units 151 and 152 provided along the transfer path 312. In the decolorizing section 15, the decolorizing units abut against the both sides of the sheet and heat them so as to decolorize the images on the both sides of the sheet at once. In a case where an image on a sheet is formed by a decolorable colorant capable of being decolorized by light irradiation, the decolorizing section may be a section that irradiates the sheet with light so as to decolorize the image on the sheet.

Among sheets transferred to the transfer path 321 from the ring-shaped transfer path 312, reusable sheets on which images have been decolorized are discharged to the reusable sheet cassette 12 from the transfer path 321. The transfer path 321 is provided with a junction P3 with the transfer path 322 whose end is connected to the rejected sheet cassette 13. Non-reusable sheets with colored images thereon are transferred to the downstream side of the junction P3 on the transfer path 321, and then switch back-transferred to the transfer path 322 side and discharged to the rejected sheet cassette 13 from the transfer path 322.

The sensors 16 are of a contact or non-contact type and provided at various positions along the transfer path 30 to detect sheets. The sensors 16 are provided before and after the reading section 14 in the transferring direction or before and after the decolorizing section 15 in the transferring direction on the transfer path 312, for example.

Figure 2:
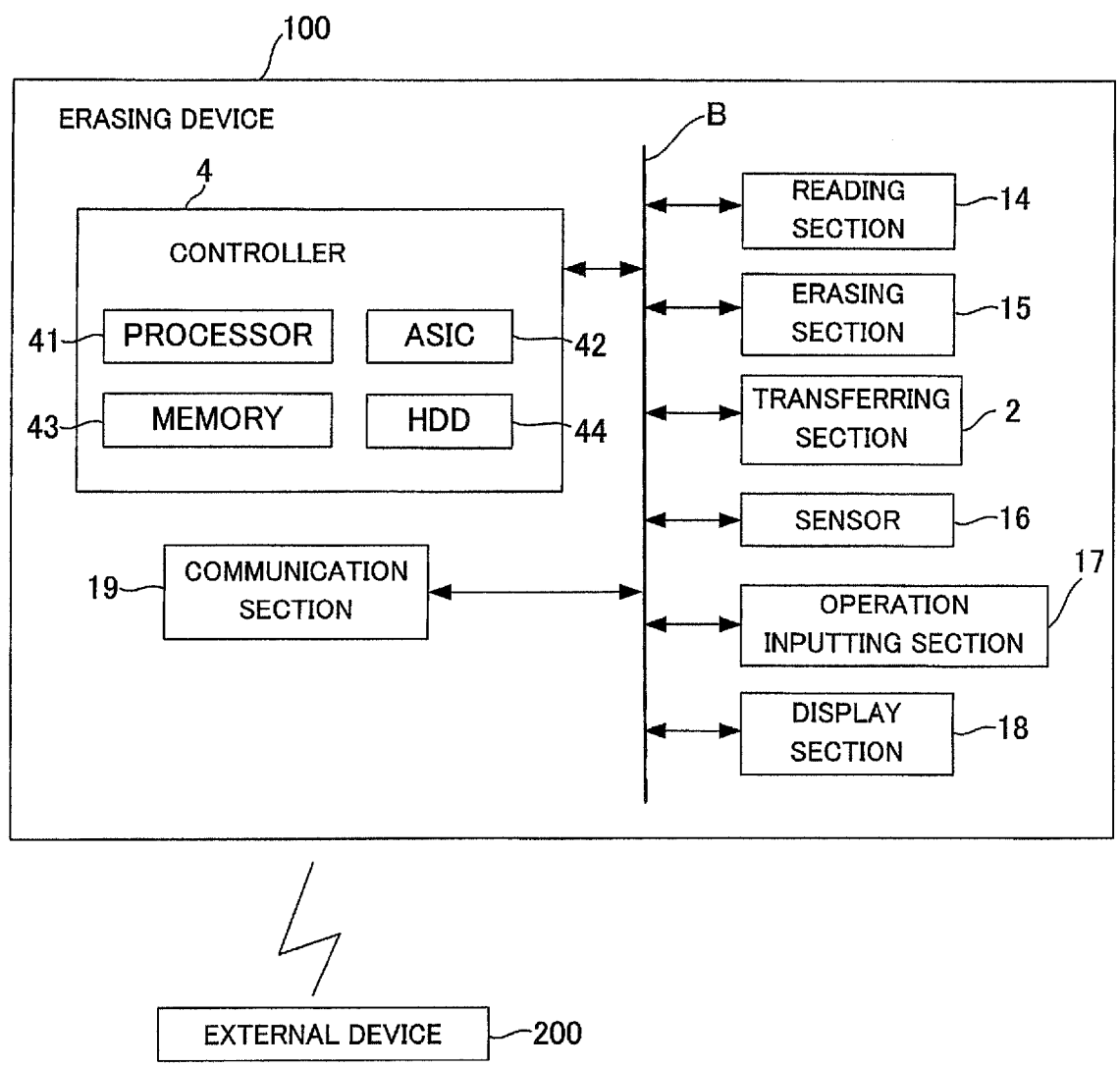
FIG. 2 is a block diagram showing the hardware configuration of the decolorizing device.

FIG. 2 is a block diagram showing the hardware configuration of the decolorizing device 100.

The decolorizing device 100 includes a controller 4, an operation inputting section 17, a display section 18, and a communication section 19 in addition to the reading section 14, the decolorizing section 15, the sensor 16, and the transferring section 2 described above. The elements 14 to 19, 2, and 4 are connected with each other via a bus B.

The controller 4 includes a processor 41, an ASIC 42 (application specific integrated circuit), the memory 43, and an HDD 44 (hard disk drive), and controls the whole decolorizing device 100.

The operation inputting section 17 includes the touch-panel type display section 18 and operation keys such as a numeric keypad, a stop key, and a start key, and accepts operation inputs from a user.

The display section 18 displays a setting information, an operation status, and a log information of the decolorizing device 100, and notification to a user.

The communication section 19 is an interface to obtain connection with an external device. The communication section 19 communicates with an external device 200 on a network in a wireless or wired manner.

The decolorizing device 100 reads an image on a sheet before the decolorizing process is performed on the sheet under the control of the controller 4, stores the read image data in the memory 43 once, and determines if the decolorizing process is necessary or not based on the image data read out from the memory 43. The decolorizing device 100 has a plurality of decolorizing modes having different processing steps in the determination and after the determination.

The decolorizing device 100 has a first decolorizing mode for turning ON the decolorizing section to perform the decolorizing process on a sheet after the completion of the above-described determination and for performing a process of decolorizing an image formed on a white sheet whose base color is white. The decolorizing device 100 has a second decolorizing mode for performing a process of decolorizing an image on a color sheet whose base color is a chromatic color. The decolorizing device 100 has a third decolorizing mode for reading an image on a sheet in gray-scale.

The decolorizing device 100 has a fourth decolorizing mode for determining if the decolorizing process is necessary or not based on a color of an image on a sheet. The decolorizing device 100 has a fifth decolorizing mode. In the fifth decolorizing mode, the decolorizing device 100 specifies a range where an image exists based on the image data, and determines if an undecolorized portion exists or not only in the above-described specified range after the decolorizing process.

The decolorizing device 100 has a sixth decolorizing mode for transferring a sheet to the decolorizing section 15 in an ON state and performing the decolorizing process on the sheet even if the determination if the decolorizing process is necessary or not has not been completed.

Figure 3:
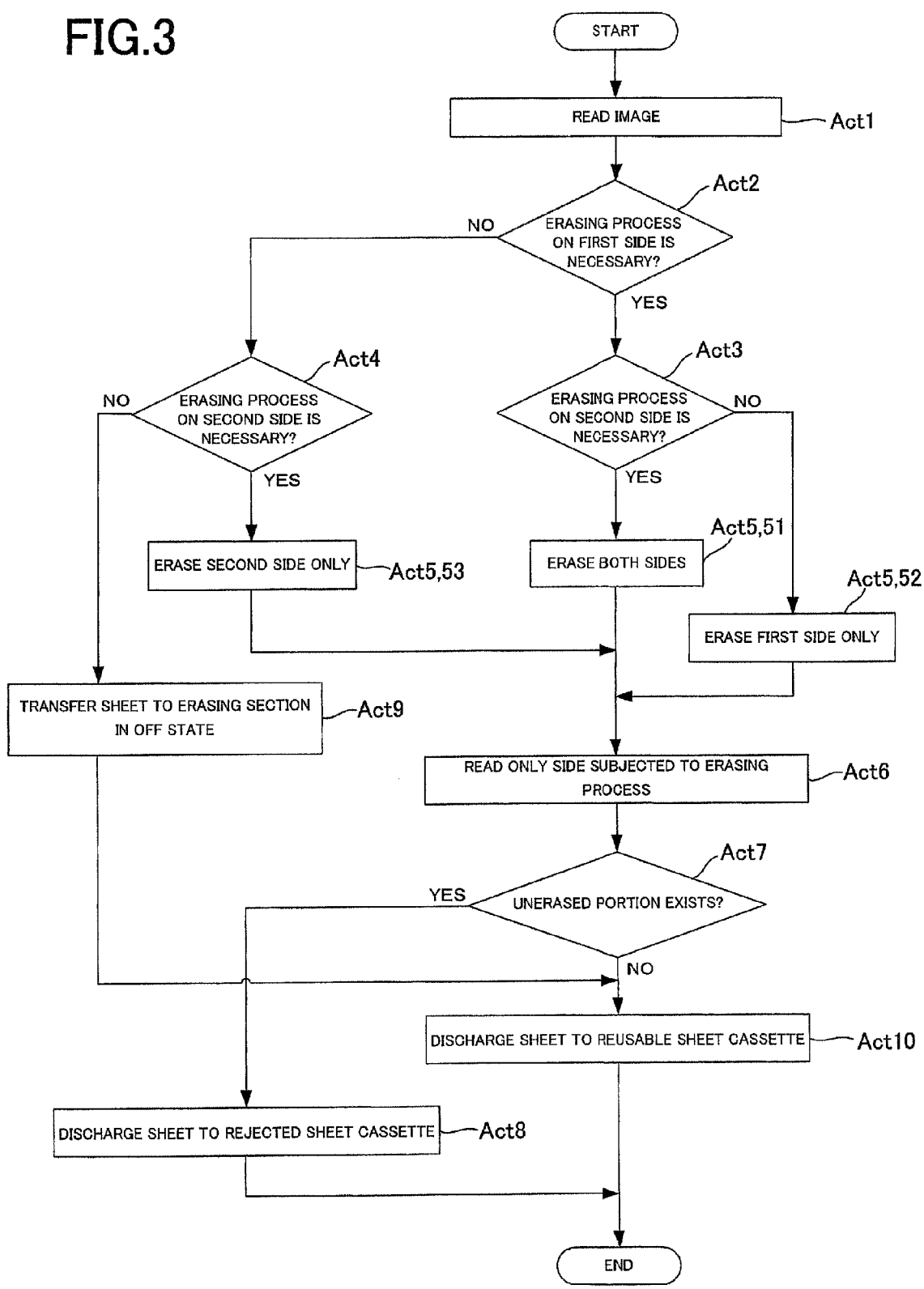
FIG. 3 is a flow chart for explaining a decolorizing process conducted by the decolorizing device.

A decolorizing process by the decolorizing device 100 will be described below with reference to a flow chart of FIG. 3. In the present embodiment, the decolorizing device 100 is set in the first decolorizing mode for performing the process of decolorizing an image on a white sheet.

The controller 4 takes out one sheet from the sheet feeding cassette 11 and transfers the sheet to the reading section 14. The controller 4 reads images on both sides of the sheet at the reading section 14 (Act1). At that time, the controller 4 performs the reading at the reading section 14 at a low resolution or thins out pixel components from the image data obtained by the reading section 14 to reduce the resolution thereof in order to shorten data processing time. Then, the image data (first image data) is stored in the memory 43.

Figure 4:
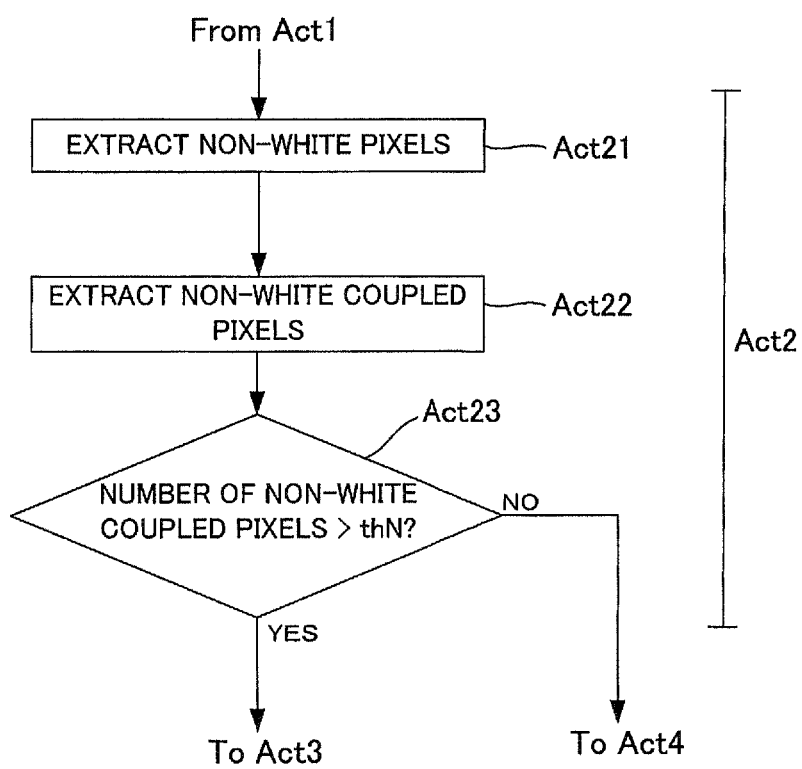
FIG. 4 is a flow chart for explaining a process of determining if the decolorizing process is necessary or not.

The controller 4 determines if an image exists or not on the first side of the sheet, i.e., determines if the decolorizing process is necessary or not on the first side of the sheet based on the image data of the first side, which has been stored in the memory 43 (Act2). Such determination will be specifically described below with reference to a flow chart of FIG. 4.

First, as referenced in the following expression (1), the controller 4 extracts, as non-white pixels, pixels in each of which any one of brightness values R, G, and B thereof is less than a threshold thR, thG, or thB based on the image data of the first side (Act21).

$$R < thR \text{ or } G < thG \text{ or } B < thB \quad (1)$$

Next, the controller 4 extracts, from among the non-white pixels, pixels successively existing in a sub-scanning direction, which is the sheet transferring direction, by an amount equal to or greater than a threshold Nx as non-white pixels coupled in the sub-scanning direction. The controller 4 extracts, from among the non-white pixels coupled in the sub-scanning direction, pixels successively existing in a scanning direction perpendicular to the sub-scanning direction by an amount equal to or greater than a threshold Ny as non-white coupled pixels (Act22).

The controller 4 determines that the first side contains no images, i.e., determines that the decolorizing process is unnecessary on the first side if the number of the non-white coupled pixels is lower than or equal to a threshold thN (Act23: NO, Act2: NO). The controller 4 determines that the first side contains an image, i.e., determines that the decolorizing process is necessary if the number of the non-white coupled pixels is greater than the threshold thN (Act23: YES, Act2: YES).

After it is determined if the decolorizing process is necessary or not on the first side, the controller 4 similarly determines if the decolorizing process is necessary or not on the second side (Act3 or Act4). The controller 4 makes the sheet waited between the reading section 14 and the decolorizing section 15 until the completion of the above-described determination.

If it is determined that the decolorizing process is necessary on any side (Act3: YES, Act3: NO, ACT4: YES), the controller 4 turns ON only the decolorizing unit 151 or 152 corresponding to the side determined to require the decolorizing process and transfers the sheet to the decolorizing section 15. The controller 4 heats only the side determined to require the decolorizing process with the decolorizing unit 151 or 152 so as to perform the process of decolorizing the image on the side (Act5 (Act51 to Act53)). Note that the controller 4 may constantly turn ON both of the decolorizing units 151 and 152 and may control the decolorizing section 15 so as to be able to decolorize an image even if the image is on any side of the sheet. In this case, it is possible to perform the decolorizing process regardless of the result of the determination if the decolorizing process is necessary or not on the first side or the result of the determination if the decolorizing process is necessary or not on the second side.

The controller 4 transfers the sheet having been subjected to the decolorizing process to the reading section 14, turns ON only the reading unit 141 or 142 corresponding to the side determined to require the decolorizing process, and reads only the image on the side determined to require the decolorizing process (Act6). Then, the controller 4 controls the reading section 14 to perform the reading at a resolution higher than that before the decolorizing process.

Based on the image data of the side having been subjected to the decolorizing process, the controller 4 determines if there exists or not an image with a size equal to or greater than the threshold on the side using a method similar to that in Act2, i.e., determines if there is an undecolorized portion or not on the side having been subjected to the decolorizing process (Act7). In particular, in a case where the decolorizing process is performed on the both sides of the sheet, the controller 4 determines if there is an undecolorized portion or not on each of the both sides of the sheet. In a case where the decolorizing process is performed only on one side of the sheet, the controller 4 determines if there is an undecolorized portion or not only on the one side.

If the controller 4 determines that there is an undecolorized portion at least on one of the sides subjected to the decolorizing process (Act7: YES), the sheet is discharged to the rejected sheet cassette 13 from the ring-shaped transfer path 312 through the transfer path 321 (Act8).

If it is determined that no images exist on both sides of the sheet before performing the decolorizing process (Act4: NO), the controller 4 makes the sheet pass through the decolorizing section 15 and the reading section 14 in an OFF state (Act9), and then discharges the sheet to the reusable sheet cassette 12 through the transfer paths 321 and 322 (Act10). Also, if it is determined that there is no undecolorized portion on the side having been subjected to the decolorizing process (Act7: NO), the controller 4 discharges the sheet to the reusable sheet cassette 12 through the transfer paths 321 and 322 (Act10).

In the present embodiment, when determining if there exists an undecolorized portion or not on the side having been subjected to the decolorizing process, only the image data regarding the side subjected to the decolorizing process is transferred to the memory 43. Thus, when compared with a case where image data regarding the both sides of a sheet is always transferred to the memory 43, the present embodiment makes it possible to shorten time required for the determination process and eventually time required for the decolorizing process.

In the present embodiment, when determining if there exists an undecolorized portion or not on the side having been subjected to the decolorizing process, only the image data regarding the side subjected to the decolorizing process is analyzed. Thus, when compared with a case where image data regarding the both sides of a sheet is always analyzed, the present embodiment makes it possible to shorten the analysis time and eventually time required for the decolorizing process.

Second Embodiment

Figure 5:
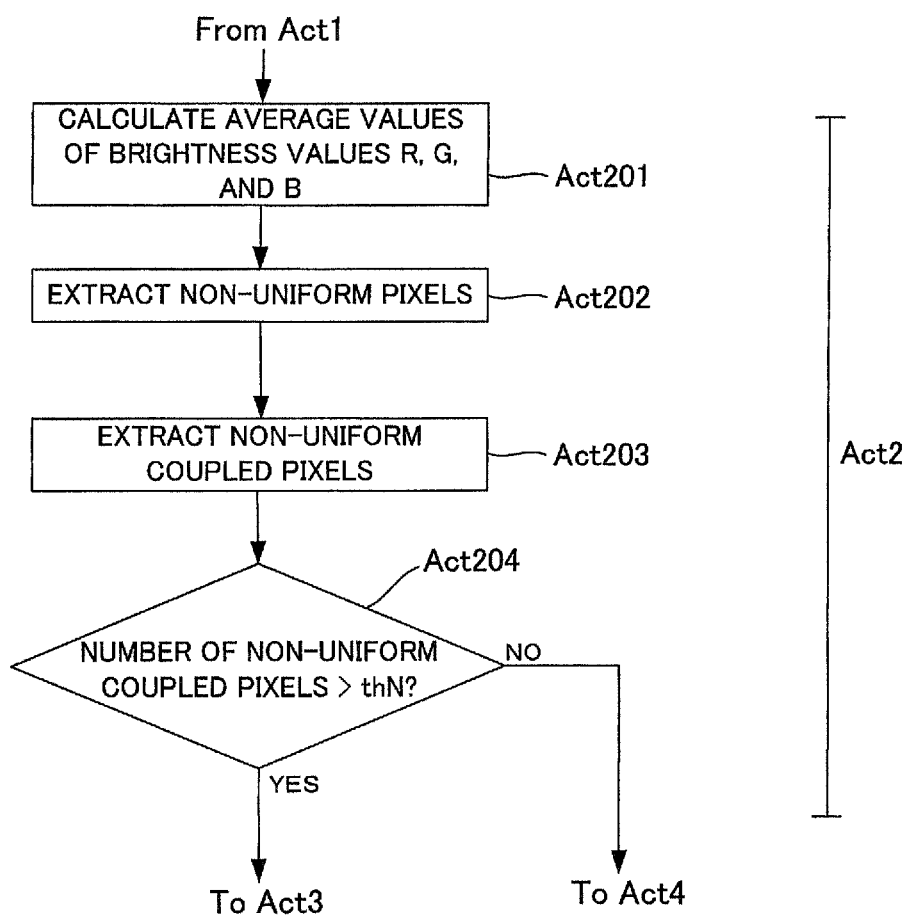
FIG. 5 is a flow chart for explaining a determination process of a second embodiment.

In the present embodiment, the decolorizing device 100 is set in the second decolorizing mode for performing the process of decolorizing an image on a color sheet. The present embodiment differs from the first embodiment in Act2 to Act4 and Act7 for determining if an image exists on a sheet or not. Processes in Act2 to Act4 and Act7 of the present embodiment will be briefly described below with reference to a flow chart of FIG. 5 and the above-described flow chart of FIG. 3.

The controller 4, for example, reads 128 lines from an upstream side in the sub-scanning direction (from the head of the sheet) in the image data on the sheet which has been read before the decolorizing process, and calculates averages aveR, aveG, and aveB of the brightness values R, G, and B of pixels existing in this range (Act201).

The controller 4 extracts, as non-uniform pixels, pixels in each of which any one of absolute values of differences between the brightness values R, G, and B thereof and the averages aveR, aveG, and aveB is greater than a threshold thR', thG', or thB' as referenced in the following expression (2) (Act202). Such extraction is performed for pixels on the whole page.

$$|R-aveR|>thR' \text{ or } |G-aveG|>thG' \text{ or}$$

$$|B-aveB|>thB' \qquad (2)$$

The controller 4 extracts, from among the non-uniform pixels, pixels successively existing in the sub-scanning direction by an amount equal to or greater than the threshold Nx as non-uniform pixels coupled in the sub-scanning direction. The controller 4 extracts, from among the non-uniform pixels coupled in the sub-scanning direction, pixels successively existing in the scanning direction by an amount equal to or greater than the threshold Ny as non-uniform coupled pixels (Act203).

If the number of the non-uniform coupled pixels is smaller than or equal to the threshold thN, the controller 4 determines that no images exist on the first side, i.e., determines that the decolorizing process is unnecessary on the first side (Act204: NO, Act2: NO). If the number of the non-uniform coupled pixels is greater than the threshold thN, the controller 4 determines that an image exists on the first side, i.e., determines that the decolorizing process is necessary (Act204: YES, Act2: YES).

Thereafter, the controller 4 similarly determines if an image exists or not on the second side (Act3 and Act4). If an image exists at least on one side, the decolorizing process is performed on the side (Act5). Subsequently, the controller 4 reads only the side subjected to the decolorizing process (Act6) and determines if an image exists or not on the side subjected to the decolorizing process using a method similar to the above-described method, i.e., determines if an undecolorized portion exists or not on the side subjected to the decolorizing process (Act7).

Third Embodiment

Figure 6:
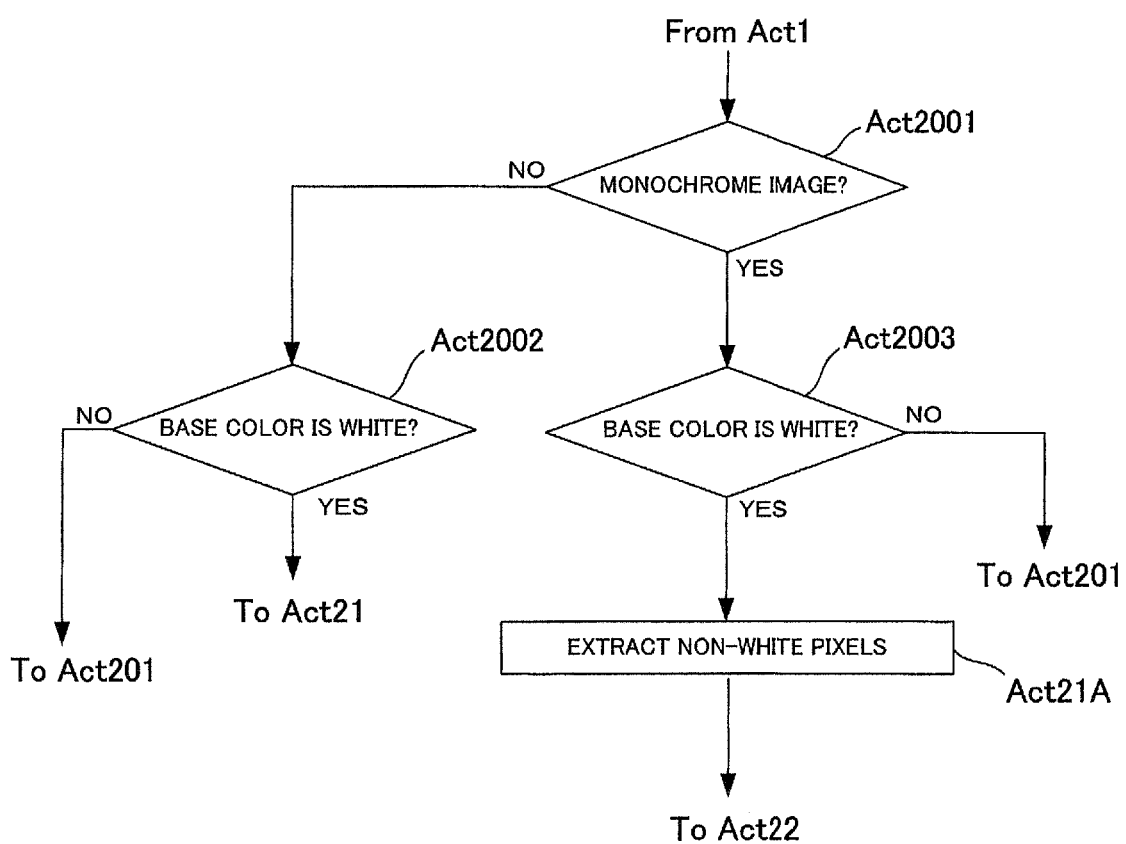
FIG. 6 is a flow chart for explaining a determination process of a third embodiment.

In the present embodiment, the decolorizing device 100 is set in the third decolorizing mode in which an image on a sheet is read in gray-scale. The present embodiment differs from the first embodiment in Act2 to Act4 and Act7 for determining if an image exists or not on a sheet. Processes in Act2 to Act4 and Act7 of the present embodiment will be briefly described below with reference to a flow chart of FIG. 6 and the above-described flow chart of FIG. 3.

The controller 4 determines if an image on the first side is a monochrome image or a color image containing a chromatic color based on the image data (Act2001). In particular, the controller 4 first extracts, as color pixels, pixels in each of which any one of absolute values |R−G|, |G−B|, and |B−R| of differences between the brightness values R, G, and B thereof is greater than a threshold th as referenced in the following expression (3).

$$|R-G|>th \text{ or } |G-B|>th \text{ or } |B-R|>th \qquad (3)$$

Then, if the number of the color pixels is greater than or equal to the threshold, the controller 4 determines that the image on the first side is a color image (Act2001: NO). In this case, the controller 4 determines if the base color of the sheet is white or a chromatic color using the known method (see Japanese Patent Application Laid-Open No. H04-90258) (Act2002). If it is determined that the base color of the sheet is white (Act2002: YES), the controller 4 determines if an image exists or not on the first side using processes similar to those in Act21 to Act23 of the first embodiment. If it is determined that the base color of the sheet is a chromatic color (Act2002: NO), the controller 4 determines if an image exists or not on the first side using processes similar to those in Act201 to Act204 of the second embodiment.

If the number of the color pixels is less than the threshold, the controller 4 determines that the image on the first side is a monochrome image (Act2001: YES). In this case, the controller 4 determines if the base color of the sheet is white or a chromatic color using the known method (Act2003). If it is determined that the base color of the sheet is white (Act2003: YES), the controller 4 extracts, as non-white pixels, pixels in each of which a brightness value K thereof is less than a threshold thK as referenced in the following expression (4) (Act21A). Such extraction is performed for pixels on the whole page. Regarding the brightness value K, K being zero means black, and K being 255 means white.

$$K<thK \qquad (4)$$

The brightness value K of each pixel may be obtained by the conversion from the brightness values R, G, and B of the pixel. Alternatively, the reading section 14 may include a line sensor for K with no color film in addition to three R, G, and B line sensors having R, G, and B films, respectively, and the reading section 14 may obtain the brightness value K of each pixel by the line sensor for K. The following processes, i.e., the processes of extracting an aggregate of non-white coupled pixels from the extracted non-white pixels and determining if an image exists or not on the sheet based on the number of the non-white coupled pixels, and the like, are similar to those in the first embodiment (Act22, Act23, and the like).

When it is determined that the base color of the sheet is a chromatic color (Act2003: NO), the controller 4, for example, reads 128 lines from the head of the sheet and calculates an average aveK of the brightness values K of pixels existing in this range (Act201) as in the second embodiment. Then, the controller 4 extracts, as non-uniform pixels, pixels in each of which the absolute value of a difference between the brightness value K thereof and the average aveK is greater than the threshold thK as referenced in the following expression (5). Such extraction is performed for pixels on the whole page.

$$|K-aveK|>thK \qquad (5)$$

The following processes, i.e., the processes of extracting an aggregate of non-uniform coupled pixels from the extracted non-uniform pixels and determining if an image exists or not on the sheet based on the number of the non-uniform coupled pixels, and the like, are similar to those in Act202 to Act204 of the second embodiment.

The controller 4 performs the decolorizing process on the sheet determined to require the decolorizing process (Act5), then reads only the side subjected to the decolorizing process (Act6), and determines if an undecolorized portion exists or not on the side (Act7).

At that time, the controller 4 performs the determination if an image exists or not on the side having been subjected to the decolorizing process using a method in accordance with the determination method for the side before being subjected to the decolorizing process. That is, in a case where the first side is determined to have a color image and the second side is determined to have a monochrome image before performing the decolorizing process, the controller 4 uses the brightness values R, G, and B for the determination if an undecolorized portion exists or not on the first side and uses the brightness value K for the determination if an undecolorized portion exists or not on the second side.

In the present embodiment, the brightness value K is used to determine if an undecolorized portion exists or not on the side determined to have a monochrome image before performing the decolorizing process. Thus, when compared with a case where the three brightness values R, G, and B are used for such determination, it is possible to shorten time required for the determination and eventually time required for the decolorizing process.

Fourth Embodiment

In the present embodiment, the decolorizing device 100 is set in the fourth decolorizing mode in which determination if the decolorizing process is necessary or not is made based on a color of an image on a sheet. An image formation using a decolorable colorant is often performed using a decolorable colorant of only one color such as cyan, for example. Thus, if it is determined before the decolorizing process that an image exists on a sheet and the color of the image is the predetermined specified one color such as cyan, for example, based on the image data, the controller 4 determines that the decolorizing process is necessary. When it is determined that no images exist on a sheet or the color of an image is not the specified one color, the controller 4 determines that the decolorizing process is unnecessary. The other processes are similar to those in the above-described first embodiment.

Even if a sheet including an image formed thereon by an indecolorable colorant is mixed into the sheet feeding cassette 11, the present embodiment makes it possible to prevent the sheet from being subjected to the decolorizing process. Thus, time required for the decolorizing process can be shortened and an energy loss can be thus suppressed.

Fifth Embodiment

In the present embodiment, the decolorizing device 100 is set in the fifth decolorizing mode, specifies a range where an image exists based on the image data, and determines if an undecolorized portion exists or not only in the above-described specified range after the decolorizing process. The present embodiment also differs from the first embodiment in Act 2 to Act4 and Act 7 for determining if an image exists or not on a sheet. The processes will be briefly described below with reference to the flow chart of FIG. 3.

Figure 7:
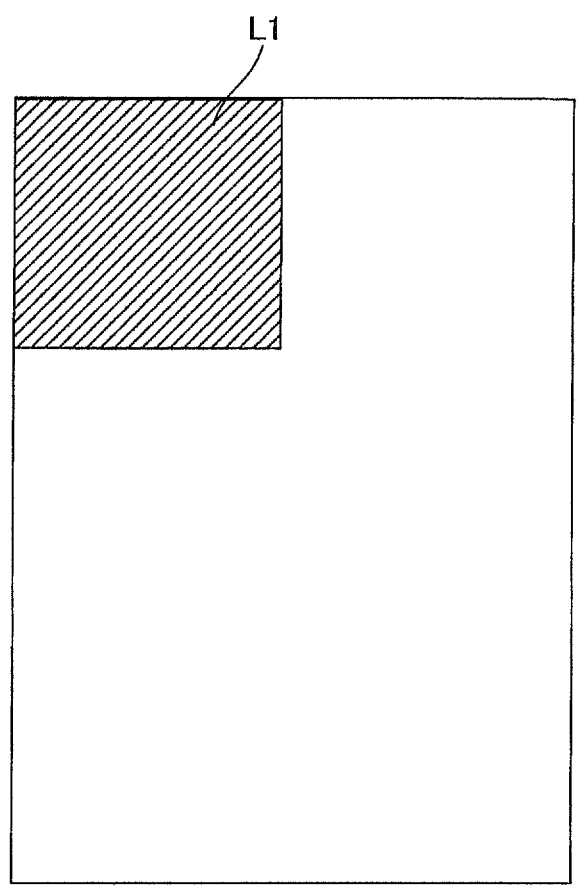
FIG. 7 is a diagram illustrating a rectangular region on an upper left side of a sheet in image data.

In Act2 before the decolorizing process, the controller 4 specifies a range where an image exists based on the image data of the first side of the sheet. As shown in FIG. 7, the controller 4 determines that an image exists in a rectangular region L1 at the upper left side of the sheet, for example (Act2: YES).

The controller 4 similarly determines the position of an image on the second side (Act3 and Act4), and then performs the decolorizing process on the side determined to have an image thereon at Act2 to Act4 (Act5). In the present embodiment, it is herein assumed that an image exists only on the first side and the controller 4 performs the decolorizing process only on the first side. The controller 4 reads the first side at a high resolution after the decolorizing process (Act6).

The controller 4 analyzes only a rectangular region L1 in the image data of the first side having been subjected to the decolorizing process corresponding to the rectangular region L1 in the low-resolution image data before performing the decolorizing process, and determines if an image exists or not in the rectangular region L1 (Act 7).

According to the present embodiment, the process of determining if an undecolorized portion exists or not is performed only on the region L1 where the image existed before the decolorizing process. Thus, the determination processing time can be further shortened.

Sixth Embodiment

Figure 8:
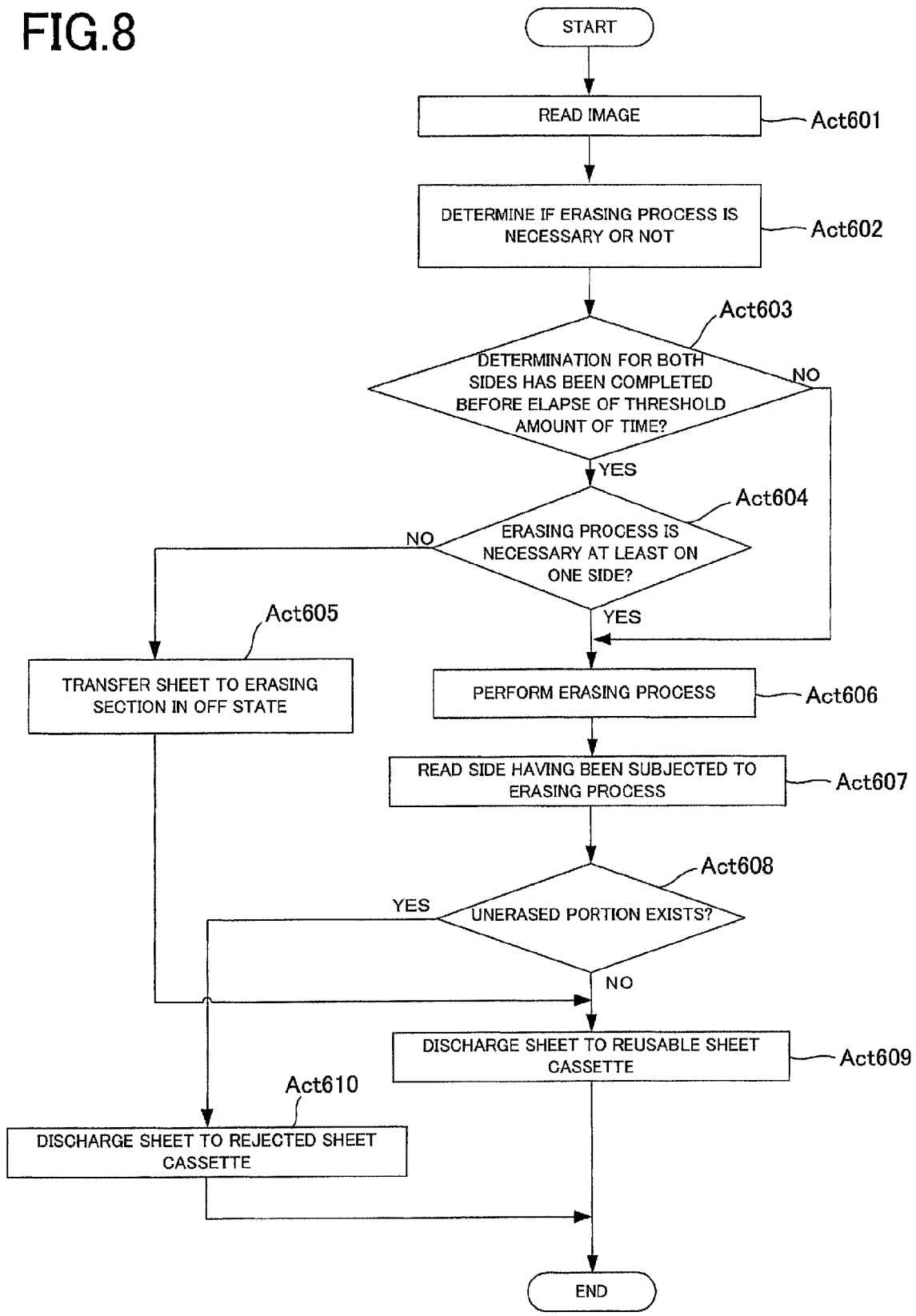
FIG. 8 is a flow chart for explaining a decolorizing process of a sixth embodiment.

In the present embodiment, the decolorizing device 100 is set in the sixth decolorizing mode. The decolorizing device 100 transfers a sheet to the decolorizing section 15 in an ON state and performs the decolorizing process on the sheet even if the determination if the decolorizing process is necessary or not has not been completed yet. The decolorizing process in the sixth decolorizing mode will be described below with reference to a flow chart of FIG. 8. Parts of processes similar to those in the first embodiment will be briefly described below.

The controller 4 reads images on both sides of a sheet at a low resolution (Act601).

The controller 4 determines if the decolorizing process is necessary or not on each of the both sides of the sheet using a process similar to that in the first embodiment (Act602).

The controller 4 transfers the read sheet to the decolorizing section 15 without making it waited between the reading section 14 and the decolorizing section 15. In a case where the above-described determination process has been completed before an elapse of a threshold amount of time since the reading of the image on the sheet at the reading section 14 (Act603: YES) and it is determined that the decolorizing process is unnecessary for both sides of the sheet (Act604: NO), the controller 4 transfers the sheet to the decolorizing section 15 while keeping the decolorizing section 15 in an OFF state (Act605). Then, after making the sheet pass through the decolorizing section 15 and the reading section 14, the controller 4 discharges the sheet to the reusable sheet cassette 12 through the transfer path 321 (Act609).

In a case where the above-described determination process has been completed before the elapse of the threshold amount of time since the reading of the image on the sheet at the reading section 14 (Act603: YES) and it is determined that the decolorizing process is necessary for any side of the sheet (Act604: YES), the controller 4 turns ON the decolorizing unit 151 or 152 corresponding to the side determined to require the decolorizing process and transfers the sheet to the decolorizing section 15. Then, the controller 4 performs the decolorizing process by the decolorizing section 15 on the side determined to require the decolorizing process (Act606).

In a case where the determination process on both sides of the sheet has not been completed before the elapse of the threshold amount of time since the reading of the image on the sheet at the reading section 14 (Act603: NO), the controller 4 turns ON the decolorizing unit 151 or 152 corresponding to the side for which the determination has not been completed yet and the decolorizing unit 151 or 152 corresponding to the side for which it has been determined that the decolorizing process is necessary. Then, the controller 4 performs the decolorizing process by the decolorizing section 15 on the side for which the determination if the decolorizing process is necessary or not has not been completed yet and the side already determined to require the decolorizing process (Act606).

Figure 9:
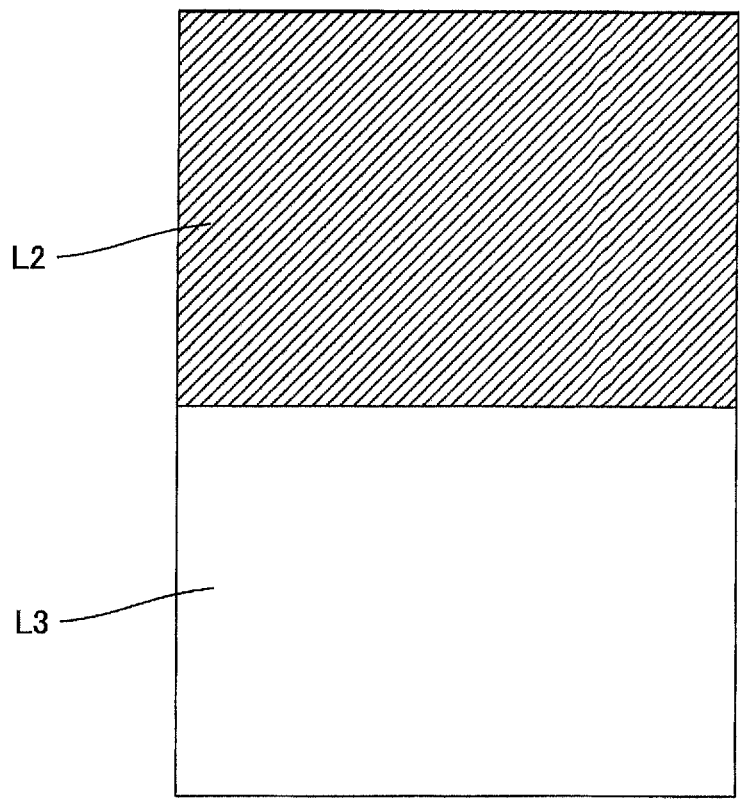
FIG. 9 is a diagram showing an upper region of a sheet in image data.

As shown in FIG. 9, it is herein assumed that the controller 4 has completed the determination process only on an upper half region L2 in the image data of the first side obtained before the decolorizing process and has not completed the determination process on a lower half region L3. It is also assumed that the upper half of the first side has been determined to have no image. If the process of determining if the decolorizing process is necessary or not has not been completed yet when the threshold amount of time is elapsed, the determination process is stopped at that moment.

In a case where the above-described determination process has already been completed when the sheet is detected by the sensor 16 provided between the reading section 14 and the decolorizing section 15 and on the upstream side of the decolorizing section 15 in the transferring direction (Act603: YES) and it has been determined that the decolorizing process is unnecessary for both sides of the sheet (Act604: NO), the controller 4 may transfer the sheet to the decolorizing section 15 while keeping the decolorizing section 15 in an OFF state (Act605). Alternatively, in a case where the above-described determination process has not been completed yet when the sheet is detected by the sensor 16 placed on the upstream side of the decolorizing section 15 in the transferring direction (Act603: NO), the decolorizing process may be performed on the side for which the determination has not been completed (Act606). In this case, the process of determining if the decolorizing process is necessary or not is stopped when the sheet is detected by the sensor 16 placed on the upstream side of the decolorizing section 15 in the transferring direction.

After Act606, the controller 4 reads the image on the side having been subjected to the decolorizing process at a resolution higher than that used when the first side is read before the decolorizing process (Act607).

Figure 10:
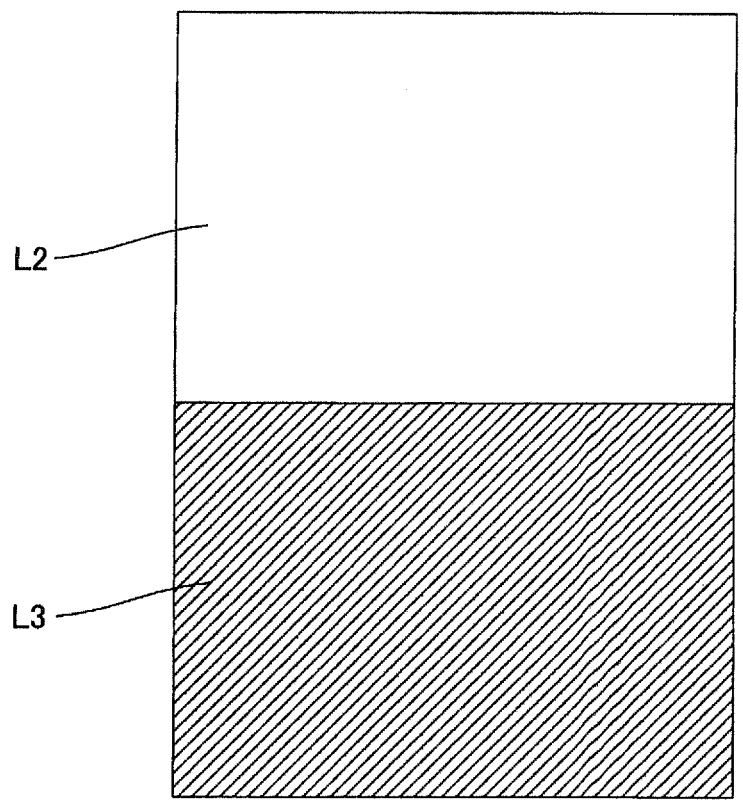
FIG. 10 is a diagram showing a lower region of the sheet in image data.

The controller 4 determines if a decolorized portion exists or not based on the image data of the side having been subjected to the decolorizing process (Act608). The controller 4 determines if an undecolorized portion exists or not on the side already determined to require the decolorizing process as with Act7 (Act2) in the first embodiment. Regarding the side for which the determination if the decolorizing process is necessary or not has not been completed yet, the controller 4 performs the process of determining if an undecolorized portion exists or not only on the region L3 where the process of determining if the decolorizing process is necessary or not has not been completed (see FIG. 10). Note that the region L3 in the high resolution image data used for the determination process after the decolorizing process corresponds to the lower half region L3 in the low resolution image data of the first side obtained at the determination process before the decolorizing process.

If it is determined that both sides thereof have no undecolorized portions (Act608: NO), the controller 4 discharges the sheet to the reusable sheet cassette 12 (Act609). If it is determined that one of the sides thereof has an undecolorized portion (Act608: YES), the controller 4 discharges the sheet to the rejected sheet cassette 13 (Act610).

In the present embodiment, a sheet is transferred to the decolorizing section 15 before the completion of the process of determining if the decolorizing process is necessary or not, whereby time required for the decolorizing process can further be shortened.

In the present embodiment, regarding the side for which the determination if the decolorizing process is necessary or not has not been completed yet, the process of determining if an undecolorized portion exists or not is performed only on the region L3 where the process of determining if the decolorizing process is necessary or not has not been completed yet. Thus, it is possible to shorten time required for the decolorizing process sufficiently.

The resolutions of the image data used in the determination processes before and after the decolorizing process may be equal to each other.

The determination process performed based on the low resolution image data before the decolorizing process may be performed by the ASIC 42, and the determination process performed based on the high resolution image data after the decolorizing process may be performed by the processor 41.

The sheet transfer path used by the transferring section for decolorizing may not be in the form of a ring. Non-ring-shaped transferring section for decolorizing may include a first reading section, a decolorizing section, and a second reading section different from the first reading section in this order from the downstream side in the transferring direction. In this case, the transferring section positioned in a portion between the first reading section and a section which is a destination of sheet discharged from the transferring section (cassette or tray, or sheet stacking sections in the body of the decolorizing device) functions as the transferring section for discharge.

The series of determination processes or the control of the various sections of the decolorizing device may be performed by the external device 200.

The recording medium may be in any form as long as it is capable of storing a program therein and being read by a computer. In particular, examples of the recording medium include an internal memory internally mounted in a computer such as a ROM or a RAM, a portable storage medium such as a CD-ROM or a flexible disk, a DVD disk, a magneto optical disk, or an IC card, a database for storing a computer program, and other computers and databases thereof. A function which can be obtained by installation or downloading may be the function realized in cooperation with an OS inside the device or the like. A part of the program or the entire program may be an execute module dynamically generated.

The order of the processes in each of the above-described embodiments may be different from that shown by way of example in each of the above-described embodiments.

As described above in detail, according to the technique described in this specification, it is possible to provide a technique capable of shortening time required for the decolorizing process.

While certain embodiments have been described, these embodiments have been presented by way of example only, and are not intended to limit the scope of invention. Indeed, the novel apparatus, methods and system described herein may be embodied in a variety of other forms; furthermore, various omissions, substitutions and changes in the form of the apparatus, methods and system described herein may be made without departing from the spirit of the inventions. The accompanying claims and their equivalents are intended to cover such forms or modifications as would fall within the scope and spirit of the inventions.

What is claimed is:

1. A decolorizing device comprising:
a first reading section configured to read a first side of the sheet;
a decolorizing section configured to perform a decolorizing process on the sheet that has been read by the first reading section;
a second reading section configured to read the first side of the sheet that has been processed by the decolorizing section; and
a controller configured to determine if the decolorizing process is necessary or not on the first side based on first image data of the first side read by the first reading section, to read the first side of the sheet having been subjected to the decolorizing process at the decolorizing section by the second reading section if it is determined that the decolorizing process is necessary, and to avoid reading of the first side of the sheet by the second reading section if it is determined that the decolorizing process is unnecessary.

2. The decolorizing device according to claim 1, wherein the controller determines that the decolorizing process is necessary if an area of an image to be decolorized is determined to be greater than or equal to a threshold on the first side.

3. The decolorizing device according to claim 1, wherein the controller determines that the decolorizing process is necessary if a color of the image is determined to be a specified color.

4. The decolorizing device according to claim 1, wherein the controller is configured to read the first side of the sheet having been subjected to the decolorizing process at the decolorizing section by the second reading section if it is determined that the decolorizing process is necessary, to obtain second image data of the first side having a resolution higher than a resolution of the first image data obtained by reading the first side at the first reading section before the decolorizing process, and to determine if an undecolorized portion exists or not on the first side based on the second image data.

5. The decolorizing device according to claim 1, wherein the controller transfers the sheet to the decolorizing section after the image on the first side is read by the first reading section, and in a case where determination if the decolorizing process is necessary or not has not been completed before the sheet reaches the decolorizing section, the controller stops the determination process and performs the decolorizing process on the first side by the decolorizing section, and then reads the first side having been subjected to the decolorizing process by the second reading section, and
the controller determines if an undecolorized portion exists or not only in a region where the determination process based on the first image data has not been completed in a region in second image data of the first side read by the second reading section.

6. The decolorizing device according to claim 1, wherein the controller determines if an image exists or not on the first side based on the first image data of the first side, and if it is determined that the image exists, the controller detects a distribution range of the image, performs the decolorizing process on the first side by the decolorizing section, reads the first side having been subjected to the decolorizing process by the second reading section, and determines if an undecolorized portion exists or not only in the detected distribution range of a region in read second image data of the first side.

7. The decolorizing device according to claim 2, wherein the first reading section serves also as the second reading section, and the first reading section and the decolorizing section are provided along a ring-shaped transfer path.

8. A sheet decolorizing method using a decolorizing device, the decolorizing device including: a first reading section configured to read a first side of the sheet; a decolorizing section configured to perform a decolorizing process on the sheet that has been read by the first reading section; and a second reading section configured to read the first side of the sheet that has been processed by the decolorizing section, the method comprising:
determining if the decolorizing process is necessary or not on the first side based on first image data of the first side read by the first reading section, reading the first side of the sheet having been subjected to the decolorizing process at the decolorizing section by the second reading section if it is determined that the decolorizing process is necessary, and avoiding reading of the first side of the sheet by the second reading section if it is determined that the decolorizing process is unnecessary.

9. The sheet decolorizing method according to claim 8, wherein it is determined that the decolorizing process is necessary if an area of an image to be decolorized is determined to be greater than or equal to a threshold on the first side.

10. The sheet decolorizing method according to claim 8, wherein it is determined that the decolorizing process is necessary if a color of the image is determined to be a specified color.

11. The sheet decolorizing method according to claim 8, wherein if it is determined that the decolorizing process is necessary, the first side of the sheet having been subjected to the decolorizing process at the decolorizing section is read by the second reading section, second image data of the first side having a resolution higher than a resolution of the first image data obtained by reading the first side at the first reading section before the decolorizing process is obtained, and it is determined if an undecolorized portion exists or not on the first side based on the second image data.

12. The sheet decolorizing method according to claim 8, wherein the sheet is transferred to the decolorizing section after the image on the first side is read by the first reading section, and in a case where determination if the decolorizing process is necessary or not has not been completed before the sheet reaches the decolorizing section, the determination process is stopped and the decolorizing process is performed on the first side by the decolorizing section, and then the first side having been subjected to the decolorizing process is read by the second reading section, and
it is determined if an undecolorized portion exists or not only in a region where the determination process based on the first image data has not been completed in a region in second image data of the first side read by the second reading section.

13. The sheet decolorizing method according to claim 8, wherein it is determined if an image exists or not on the first side based on the first image data of the first side, and if it is determined that the image exists, a distribution range of the image is detected, the decolorizing process is performed on the first side by the decolorizing section, the first side having been subjected to the decolorizing process is read by the second reading section, and it is determined if an undecolorized portion exists or not only in the detected distribution range in a region in read second image data of the first side.

14. The sheet decolorizing method according to claim 9, wherein the first reading section serves also as the second reading section, and the first reading section and the decolorizing section are provided along a ring-shaped transfer path.

15. A non-transitory computer-readable medium storing instructions for recording non-temporarily a decolorizing process program that allows a decolorizing device to perform a decolorizing process on a sheet, the decolorizing device including: a first reading section configured to read a first side of the sheet; a decolorizing section configured to perform the decolorizing process on the sheet that has been read by the first reading section; and a second reading section configured to read the first side of the sheet that has been processed by the decolorizing section, the decolorizing process program allowing the decolorizing device to:

determine if the decolorizing process is necessary or not on the first side based on first image data of the first side read by the first reading section, read the first side of the sheet having been subjected to the decolorizing process at the decolorizing section by the second reading section if it is determined that the decolorizing process is necessary, and avoid reading of the first side of the sheet by the second reading section if it is determined that the decolorizing process is unnecessary.

16. The computer-readable medium according to claim 15, wherein the recording medium non-temporarily records the decolorizing process program configured to allow the decolorizing device to determine that the decolorizing process is necessary if an area of an image to be decolorized is determined to be greater than or equal to a threshold on the first side.

17. The computer-readable medium according to claim 15, wherein the recording medium non-temporarily records the decolorizing process program configured to allow the decolorizing device to determine that the decolorizing process is necessary if a color of the image is determined to be a specified color.

18. The computer-readable medium according to claim 15, wherein the recording medium non-temporarily records the decolorizing process program configured to allow the decolorizing device to read the first side of the sheet having been subjected to the decolorizing process at the decolorizing section by the second reading section if it is determined that the decolorizing process is necessary, to obtain second image data of the first side having a resolution higher than a resolution of the first image data obtained by reading the first side at the first reading section before the decolorizing process, and to determine if an undecolorized portion exists or not on the first side based on the second image data.

19. The computer-readable medium according to claim 15, wherein the decolorizing device includes: a reusable sheet stacking section configured to stack a reusable sheet; and a rejected sheet stacking section configured to stack a non-reusable sheet, and the recording medium non-temporarily records the decolorizing process program configured to allow the decolorizing device to transfer the sheet to the decolorizing section after the image on the first side is read by the first reading section, to stop determination if the decolorizing process is necessary or not and perform the decolorizing process on the first side by the decolorizing section if the determination process has not been completed before the sheet reaches the decolorizing section, and then to read the first side having been subjected to the decolorizing process by the second reading section, and to determine if an undecolorized portion exists or not only in a region where the determination process based on the first image data has not been completed in a region in second image data of the first side read by the second reading section.

20. The computer-readable medium according to claim 15, wherein the recording medium non-temporarily records the decolorizing process program configured to allow the decolorizing device to determine if an image exists or not on the first side based on the first image data of the first side; and to detect a distribution range of the image if it is determined that the image exists, to perform the decolorizing process on the first side by the decolorizing section, to read the first side having been subjected to the decolorizing process by the second reading section, and then to determine if an undecolorized portion exists or not only in the detected distribution range in a region in read second image data of the first side.

* * * * *